(12) United States Patent
Reyhanloo

(10) Patent No.: US 8,770,099 B2
(45) Date of Patent: Jul. 8, 2014

(54) BEVERAGE PREPARATION MACHINE AND METHOD FOR CLEANING A BEVERAGE PREPARATION MACHINE

(75) Inventor: Shahryar Reyhanloo, Lohn-Ammansegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 594 days.

(21) Appl. No.: 12/832,645

(22) Filed: Jul. 8, 2010

(65) Prior Publication Data

US 2011/0005407 A1    Jan. 13, 2011

(30) Foreign Application Priority Data

Jul. 8, 2009  (EP) .................................... 09405110

(51) Int. Cl.
*B08B 9/027* (2006.01)
*A01J 15/00* (2006.01)

(52) U.S. Cl.
USPC ...... 99/453; 134/22.12; 134/22.15; 134/25.4; 134/34; 134/40; 134/42; 99/452; 99/454; 99/455; 99/456; 99/460; 99/461; 99/462; 99/465; 99/466

(58) Field of Classification Search
CPC ............. A47J 31/44; A47J 31/60; B08B 9/00
USPC ........... 134/22.11, 22.12, 22.15, 25.4, 34, 40, 134/42; 99/452–466
See application file for complete search history.

(56) References Cited

U.S. PATENT DOCUMENTS 2,770,248 A * 11/1956 Audia ........................... 137/240
2,961,853 A * 11/1960 Cohrt ............................. 62/518
3,132,656 A * 5/1964 Rankin ........................ 134/98.1

(Continued)

FOREIGN PATENT DOCUMENTS

DE    199 55 195 A1    5/2001
DE    19955195 A1 *    5/2001

(Continued)

OTHER PUBLICATIONS

European Search Report for Application No. EP 09 40 5110 dated Sep. 18, 2009.

*Primary Examiner* — Dana Ross
*Assistant Examiner* — Brett Spurlock
(74) *Attorney, Agent, or Firm* — Alston & Bird LLP

(57) ABSTRACT

The invention relates to a beverage preparation machine comprising an apparatus for frothing or heating milk, which apparatus is connected via a milk suction hose to a milk container, and a cleaning apparatus for cleaning the milk suction hose and the apparatus for frothing or heating milk by means of a flushing fluid. The milk can be sucked from the milk container into the apparatus for frothing or heating milk by means of a vacuum which can be generated in the apparatus for frothing or heating milk. The cleaning apparatus contains a switching valve which can be switched into an operating position in which a milk connection is enabled between the milk container and the apparatus for frothing or heating milk via the milk suction hose and into a flushing position in which a first flushing fluid connection is enabled between a flushing fluid outlet of the beverage preparation machine and the apparatus for frothing or heating milk via a flushing hose, the switching valve switched into the flushing position and the milk suction hose.

13 Claims, 4 Drawing Sheets

(56) References Cited

U.S. PATENT DOCUMENTS

| | | | |
|---|---|---|---|
| 4,083,295 A * | 4/1978 | Hollingsworth | 99/283 |
| 4,421,014 A * | 12/1983 | Vicker | 99/289 P |
| 4,465,210 A * | 8/1984 | Iwanami | 222/148 |
| 4,575,615 A * | 3/1986 | Shigenobu et al. | 392/450 |
| 4,714,011 A * | 12/1987 | Ly | 99/279 |
| 4,715,274 A * | 12/1987 | Paoletti | 99/454 |
| 4,735,133 A * | 4/1988 | Paoletti | 99/454 |
| 4,757,752 A * | 7/1988 | Robins et al. | 99/279 |
| 4,779,519 A * | 10/1988 | Giuliano | 99/275 |
| 4,848,381 A * | 7/1989 | Livingston et al. | 134/57 R |
| 4,994,392 A * | 2/1991 | Welledits et al. | 99/278 |
| 5,115,730 A * | 5/1992 | Gockelmann | 99/280 |
| 5,158,793 A * | 10/1992 | Helbling | 426/231 |
| 5,207,148 A * | 5/1993 | Anderson et al. | 99/281 |
| 5,259,296 A * | 11/1993 | Mikael et al. | 99/280 |
| 5,302,407 A * | 4/1994 | Vetterli | 426/433 |
| 5,309,822 A * | 5/1994 | Sager | 99/289 R |
| 5,329,950 A * | 7/1994 | Barinas | 134/95.3 |
| 5,367,947 A * | 11/1994 | Lussi et al. | 99/287 |
| 5,490,447 A * | 2/1996 | Giuliano | 99/286 |
| 5,503,064 A * | 4/1996 | Scheel et al. | 99/453 |
| 5,611,262 A * | 3/1997 | Rizzuto et al. | 99/294 |
| 5,855,295 A * | 1/1999 | Lee | 222/1 |
| 6,024,252 A * | 2/2000 | Clyde | 222/105 |
| 6,089,242 A * | 7/2000 | Buck | 134/57 R |
| 6,959,642 B1 * | 11/2005 | Landolt | 99/455 |
| 7,021,206 B2 * | 4/2006 | Eckenhausen et al. | 99/452 |
| 7,252,034 B1 * | 8/2007 | Eckenhausen et al. | 99/293 |
| 7,322,275 B2 * | 1/2008 | Lussi | 99/281 |
| 7,325,485 B2 * | 2/2008 | Carhuff et al. | 99/452 |
| 7,401,613 B2 * | 7/2008 | Carhuff et al. | 134/22.18 |
| 7,550,169 B2 * | 6/2009 | Green et al. | 426/580 |
| 7,882,801 B2 * | 2/2011 | Akerman | 119/14.02 |
| 7,927,642 B2 * | 4/2011 | Campetella et al. | 426/433 |
| 8,056,469 B2 * | 11/2011 | Sala et al. | 99/290 |
| 2002/0119574 A1 * | 8/2002 | Berg | 436/55 |
| 2003/0232115 A1 * | 12/2003 | Eckenhausen et al. | 426/477 |
| 2004/0194811 A1 * | 10/2004 | Carhuff et al. | 134/25.3 |
| 2005/0066820 A1 * | 3/2005 | Lussi | 99/279 |
| 2005/0109214 A1 * | 5/2005 | Bruttin et al. | 99/279 |
| 2005/0172833 A1 * | 8/2005 | Ioannone et al. | 99/453 |
| 2006/0230943 A1 * | 10/2006 | Stieger et al. | 99/279 |
| 2006/0236874 A1 * | 10/2006 | Ozanne | 99/452 |
| 2006/0237041 A1 * | 10/2006 | Morden | 134/22.12 |
| 2007/0113790 A1 * | 5/2007 | Akerman | 119/14.02 |
| 2007/0240582 A1 * | 10/2007 | Eimer et al. | 99/323.3 |
| 2007/0261565 A1 * | 11/2007 | Reyhanloo | 99/280 |
| 2007/0281052 A1 * | 12/2007 | Goodwin et al. | 426/11 |
| 2008/0163896 A1 * | 7/2008 | Ioannone | 134/18 |
| 2009/0095163 A1 * | 4/2009 | Sala et al. | 99/284 |
| 2009/0314165 A1 * | 12/2009 | Blockwoldt et al. | 99/288 |

FOREIGN PATENT DOCUMENTS

| | | |
|---|---|---|
| EP | 1 911 382 A1 | 4/2008 |
| WO | WO 97/27793 A1 | 8/1997 |
| WO | WO 2008/006623 A2 | 1/2008 |

* cited by examiner

BEVERAGE PREPARATION MACHINE AND METHOD FOR CLEANING A BEVERAGE PREPARATION MACHINE

CROSS-REFERENCE TO RELATED APPLICATION

This application claims the benefit of European Patent Application No. 09405110.9, filed Jul. 8, 2009, which is hereby incorporated herein in its entirety by reference.

FIELD

The invention relates to a beverage preparation machine and a method for cleaning a beverage preparation machine.

BACKGROUND

Known beverage preparation machines contain apparatus for frothing and/or heating milk. In this case, milk is, for example, sucked into a vacuum chamber formed in the respective apparatus for frothing and/or heating milk, in which a vacuum is achieved by introducing (water vapour) steam (e.g. in the form of a steam jet) according to the Venturi principle, through a milk suction hose from a usually separate milk container and is heated therein by the steam and possibly frothed with added air in order to produce heated milk or milk froth or a mixture of heated milk and milk froth. Beverage preparation machines having an integrated apparatus for frothing and/or heating milk are also known which make it possible to produce as desired coffee (without added milk) or heated milk (without added coffee) or white coffee (without added milk froth) or specialty coffees which contain milk froth or frothy milk (for example, cappuccino or latte macchiato).

A problem with all these apparatus which handle milk is that milk residues remain in the system for a fairly long time. Milk perishes rapidly, particularly promoted by lack of cooling. In order that the milk located in the system after a milk withdrawal does not perish or become contaminated, the parts coming in contact with milk should be thoroughly cleaned or flushed at the shortest possible time intervals.

For this purpose, the apparatus for frothing and/or heating milk can be cleaned by passing, for example, steam therethrough without introducing milk.

A separate cleaning of the milk suction hose in which milk residues are also located can be carried out by removing this and flushing it by hand under running water.

Another method for cleaning the milk suction hose is known in which one end of the milk suction hose through which the milk is otherwise sucked into the milk container is removed from this, dipped temporarily into a container containing cleaning liquid and then a milk withdrawal is made at the beverage preparation machine, wherein the cleaning fluid (instead of milk) is then sucked through the milk suction hose and this is thereby cleaned or flushed. However, these steps are cumbersome and in addition the user is forced to touch the outer circumference of the milk suction hose which had been previously dipped in the milk, whereby the user gets his hands dirty. Also that outer circumference of the milk suction hose can become contaminated by the user. The milk suction hose could then be contaminated with bacteria in conjunction with the milk as growth medium. After flushing the milk suction hose with the cleaning fluid, it is expedient to flush the milk suction hose with a suitable fluid, for example, water in order to ensure that residues of the cleaning fluid possibly present in the milk suction hose are eliminated and the milk suction hose is therefore ensured to be free from residues of the cleaning fluid. After this process water residues can still be present in the hose. These water residues are sucked into the apparatus for frothing and/or heating milk during a next withdrawal of milk and could result in a taste impairment particularly if the water has been left standing after a fairly long non-usage of the beverage preparation machine.

At present, the milk suction hose is either not flushed at all, flushed by hand, as described above or it must be connected to a separate water outlet of the beverage preparation machine.

EP 1 797 801 discloses an apparatus for supplying milk in which one end of a milk suction hose is connected to an apparatus for frothing and/or heating milk and the other end is dipped in a milk supply in a milk container. In order to clean the milk suction hose, it is proposed in this case to remove this end of the milk suction hose located in the milk supply in the milk container and to connect this to a cleaning apparatus which dispenses hot water and/or steam. Hot water and/or steam is then withdrawn from the cleaning apparatus, passed through the milk suction hose and the apparatus for frothing and/or heating milk, thereby flushing this apparatus and the milk suction hose and is finally removed through the milk outlet.

It is disadvantageous in this connection that for this purpose the user must touch outer regions of the milk suction hose which are wetted with milk so that the user gets his hands dirty. In addition, these regions can possibly be contaminated by the user with bacteria in conjunction with the milk as growth medium, which can promote the multiplication of harmful bacteria. Since this region of the milk suction hose is subsequently again dipped into the milk of the milk container, the bacteria can then be transferred into the milk which can lead to a health hazard. It is also disadvantageous that only hot water and/or steam is passed through the milk suction hose which can lead to inadequate cleaning depending on the degree of contamination. In addition, water residues are still present in the system after this process.

EP 2 020 197 discloses a beverage preparation machine having a cleaning apparatus for cleaning internal lines which carry milk. In this case, various valves must be controlled or actuated for flushing. A valve 14 can be switched so that a cleaning fluid can flow from a source 13 into the milk path. Various valves are switched so that in each case a closed circuit is formed through which the cleaning fluid can be pumped by means of a pump 11. Various circuits or paths can be switched for the cleaning fluid in order to cover various regions of the milk path.

An automatic cleaning of the milk outlet 2 is not provided. This must be cleaned separately. Special measures are required to clean a part of the milk path in the vicinity of the milk outlet. To this end the milk outlet must be removed and replaced by a cartridge 22, thereby creating a closed circuit which includes the said part of the milk path in the vicinity of the milk outlet. At the end of the cleaning procedure the cleaning fluid can be discharged via a separate outlet 19—controlled via valves 18 and 31.

In this connection it is disadvantageous that a large number of additional devices are required for cleaning the milk path which leads to high costs and results in more expensive maintenance. Automatic cleaning of the milk outlet is not possible or requires the dismantling of the milk outlet and a separate cleaning. In addition, a complex and expensive cartridge must be coupled to this position after dismantling the milk outlet which is very expensive and in particular time-consuming.

Description

It is the object of the present invention to obviate the said disadvantages and to provide a beverage preparation machine and a method for cleaning a beverage preparation machine, wherein all elements which come in contact with milk, in particular a milk suction hose and an apparatus for frothing and/or heating milk, can be automatically cleaned or flushed rapidly and simply with few hand movements.

This object is achieved by embodiments of beverage preparation machines having the features of the present invention.

The beverage preparation machine comprises an apparatus for frothing and/or heating milk, which apparatus is connected via a milk suction hose to a milk container, and a cleaning apparatus for cleaning the milk suction hose and the apparatus for frothing and/or heating milk by means of a flushing fluid which can be dispensed from a flushing fluid outlet of the beverage preparation machine.

In this context, "cleaning apparatus" is understood as an apparatus comprising a plurality of elements which can be arranged remotely with respect to one another. In this context "flushing fluid" is understood as any fluid which is suitable for continuously flushing away milk, cleaning milk residues and/or disinfecting.

According to the invention, the milk from the milk container can be sucked into the apparatus for frothing and/or heating milk (3) by means of a vacuum which can be generated in the apparatus for frothing and/or heating milk (3), and the cleaning apparatus comprises a switching valve which can be switched into an operating position in which a milk connection is enabled between the milk container and the apparatus for frothing and/or heating milk via the milk suction hose and into a flushing position in which a first flushing fluid connection is enabled between the flushing fluid outlet of the beverage preparation machine and the apparatus for frothing and/or heating milk via a flushing hose, the switching valve switched into the flushing position and the milk suction hose.

The beverage preparation machine according to the invention can, for example, be equipped with a steam line for supplying steam into the apparatus for frothing and/or heating milk, wherein the apparatus for frothing and/or heating milk is configured in such a manner that by supplying steam into the apparatus for frothing and/or heating milk, the respective vacuum can be generated in the apparatus for frothing and/or heating milk.

The beverage preparation machine according to the invention makes it possible to save the user from handling the milk suction hose contaminated with milk. In this case, an additional hose or flushing hose is merely placed at some point parallel to the milk suction hose between the beverage preparation machine and the milk container. This flushing hose is connected to the flushing fluid outlet on the side of the beverage preparation machine. In this case the fluid flushing outlet can be any source of a flushing fluid, for example, water, hot water or steam. The flushing hose is connected to an inlet of the switching valve on the side of the milk container. The switching valve contains an outlet to which the conventional milk suction hose is connected, wherein the other end of the milk suction hose is conventionally connected to the apparatus for frothing and/or heating milk. The switching valve contains another inlet to which the milk can be supplied, for example, by means of another hose or a milk suction lance from the milk container.

The switching valve can be switched into two positions, i.e. an operating position and a flushing position, wherein the respective switching can be accomplished manually or controlled by means of an electrical actuator.

In the operating position of the switching valve, it is possible to withdraw milk and/or milk froth via the apparatus for frothing and/or heating milk ("milk withdrawal" position). In this position, a milk connection between the milk container and the apparatus for frothing and/or heating milk is accordingly enabled via the milk suction hose. At the same time, the access to the flushing hose is blocked. If the user wishes to withdraw milk, the milk in the apparatus for frothing and/or heating milk is sucked in by means of steam according to the Venturi principle and is heated therein by the steam or is frothed by mixing with air.

When switching into the flushing position, the user switches the switching valve (manually or controlled by means of an electrical actuator) in such a manner that a fluid connection is enabled, beginning from the flushing fluid outlet to the flushing hose and via the switching valve to the milk suction hose and then to the apparatus for frothing and/or heating milk. On the other hand, in this flushing position the connection of the milk suction hose to the milk container is blocked by the switching valve, i.e., the milk connection between the milk container and the apparatus for frothing and/or heating milk is interrupted by the switching valve. A withdrawal of the flushing fluid via the flushing fluid outlet following switching of the switching valve into the flushing position therefore has the result that the flushing fluid flows through the flushing hose and through the milk suction hose, whereby the latter is then cleaned of milk and milk residues. The resulting fluid solution consisting of the flushing fluid and the milk residues is then passed to the apparatus for frothing and/or heating milk, whereby this is also cleaned. Finally the fluid solution is led away to the adjoining milk outlet, whereby this is also cleaned. Finally the fluid solution can be received in a vessel placed under the milk outlet and subsequently supplied to the waste water. Consequently, no milk-contaminated hoses need to be touched or reconnected which is pleasant for the user and means easier operation. In addition, any possible contamination of the milk by bacteria is prevented.

In one embodiment of the beverage preparation machine, the flushing fluid outlet is a steam line of the beverage preparation machine which is designed in such a manner to dispense steam or a hot water/steam mixture to the apparatus for frothing and/or heating milk. To this end, the steam line which is conventionally disposed upstream of the apparatus for frothing and/or heating milk can simply be tapped, wherein the flushing hose is then coupled to this tapping of the steam line. This embodiment proves to be very simple and favourable since no further devices need to be provided to dispense the flushing fluid. Also no further devices need to be provided to convey the flushing fluid such as, for example, fluid pumps. The flushing fluid dispensed from the steam line, in this case the hot water/steam mixture, also proves to be very advantageous for cleaning the milk suction hose and the apparatus for frothing and/or heating milk. This flushing fluid is very advantageous for releasing and removing any encrusted milk residues which adhere to the inner wall of the milk suction hose.

In a further embodiment the flushing fluid outlet is a hot water line of the beverage preparation machine which is designed in such a manner to dispense hot water. Many beverage preparation machines contain a separate hot water line for dispensing hot water with which tea, for example, can be prepared. In this embodiment there is also the advantage that no additional source need be provided for dispensing and/or conveying the flushing fluid.

In one embodiment of the beverage preparation machine when the switching valve is switched into the flushing position, a direct second flushing fluid connection is enabled between the steam line and the apparatus for frothing and/or heating milk. Even after a single withdrawal of milk, along with the milk suction hose the apparatus for frothing and/or heating milk is also severely contaminated by milk or milk residues. The milk suction hose certainly opens into the apparatus for frothing and/or heating milk so that in flushing operation the flushing fluid is also fed or flushed into this but a thorough cleaning of all the inner regions of this apparatus is desired. Due to the structure of this apparatus, barely accessible regions or recesses are present in the interior to which the milk residues can stubbornly adhere. In order to thoroughly and specifically clean this apparatus, it is proposed in this embodiment that a fraction of the flushing fluid should be fed directly into the apparatus for frothing and/or heating milk, without the detour via the flushing hose, the switching valve and the milk suction hose.

In a preferred embodiment a first (volume) fraction of the flushing fluid dispensed in each case from the flushing fluid outlet can be passed through the first flushing fluid connection and a second (volume) fraction of the flushing fluid dispensed in each case from the flushing fluid outlet can be passed through the second flushing fluid connection, wherein the respective volumes of the first fraction and the second fraction are in a predetermined ratio to one another. Consequently, a specific fraction of the flushing fluid is passed through the flushing hose, the milk suction hose and into the apparatus for frothing and/or heating milk and another fraction of the flushing fluid is passed directly into the apparatus for frothing and/or heating milk.

The predetermined ratio preferably lies in the range of 1/3 to 3. In order to adjust such a ratio or similar ratios between the volumes of the first and the second fraction, the fluidic properties of the two different flow paths can be set or designed according to the ratio. This would be possible for example by means of a suitable choice of the dimensions of the flushing hose and the milk suction hose (diameter, length) and/or a corresponding choice of dimensions of the two tappings of the steam line. For example, it would also be possible to incorporate an appropriate valve in the course of the steam line to the two tappings, which valve in flushing operation dispenses a first fraction of the flushing fluid to the flushing hose and a second fraction of the flushing fluid to the apparatus for frothing and/or heating milk, wherein the volumes of the two fractions are in a predetermined ratio to one another.

In the beverage preparation machine the cleaning apparatus can preferably be designed in such a manner that following the passage of the flushing fluid, steam can be passed in each case through the flushing hose, the switching valve and the milk suction hose, wherein the steam conveys the flushing fluid outwards. This has the advantage that the hoses, in particular the milk suction hose, can be completely emptied of the flushing fluid. Any residual volume of the flushing liquid remaining after the flushing operation in the milk suction hose would have the disadvantage that this residual volume is conveyed into the beverage during a subsequent milk withdrawal. This would in particular result in a disadvantageous change in the taste of the drink after a longer operating pause of the beverage preparation machine. In this case, the flushing fluid has already been left to stand for a long time and depending on the nature of the material of the milk suction hose, could absorb soluble components of the milk suction hose in the flushing fluid. If this flushing fluid then flows into the beverage, this would result in a noticeable change in the taste of the beverage. In addition, this could result in an uncontrolled after-running (after-dripping) of the flushing fluid. However, since the steam withdrawal is passed through, the remaining flushing fluid still located in the flushing hose, the switching valve and the milk suction hose is conveyed outwards completely. Any withdrawal of stagnant flushing fluid in the next milk withdrawal is therefore prevented. Any uncontrolled after-running of flushing fluid can also be prevented.

In a preferred embodiment, a cleaning container containing a cleaning agent is interposed in the course of the flushing hose. In an exemplary arrangement the flushing fluid can flow from the flushing fluid outlet through the flushing hose into the cleaning container. There the flushing fluid mixes with the cleaning agent and the mixture consisting of flushing fluid and cleaning agent flows further to the switching valve. The mixture is diverted by the switching valve into the milk suction hose and then flows via this into the apparatus for frothing and/or heating milk and from there via the milk outlet into the vessel located thereunder.

The cleaning container is preferably disposed on the milk container. In this case the cleaning container can be accommodated in a milk container lid of the milk container.

In a further embodiment the cleaning agent is a cleaning fluid or a cleaning tablet. In this case a certain fraction of the flushing fluid mixes with the cleaning fluid or slowly dissolves the cleaning tablet and mixes with the dissolved fractions. The mixture then flows via the switching valve through the milk suction hose. The flushing fluid mixed with the cleaning agent has an excellent property for cleaning in particular the milk suction hose and the apparatus for frothing and/or heating milk and is better suited for this purpose that the mere use of water or a hot water/steam mixture. Consequently a permanent taste neutrality and in addition a longer lifetime of the beverage preparation machine is rendered possible.

The switching valve can preferably be actuated by means of an electrical actuator. Consequently, the flushing operation for cleaning the beverage preparation machine of milk and milk residues, in particular the cleaning of the milk suction hose, can be actuated at the press of a button by the user without the switching valve needing to be switched mechanically for this purpose. The electrical switching could be accomplished by means of a control of the beverage preparation machine by operating a user interface. For example, this flushing operation could take place automatically as soon as the beverage preparation machine is switched on and/or off, similar to a conventional flushing operation for flushing the brewing assembly and fluid lines of the beverage preparation machine.

The preceding advantage of the present invention is also achieved by a method for cleaning a beverage preparation machine according to claim 12, which is distinguished by its simple and efficient sequence and which can be achieved constructively particularly simply and cost-effectively.

The method comprises the steps: a) switching the switching valve into a flushing position in which a first flushing fluid connection is enabled between the flushing fluid outlet of the beverage preparation machine and the apparatus for frothing and/or heating milk via the flushing hose, the switching valve switched into the flushing position and the milk suction hose, b) dispensing flushing fluid from the flushing fluid outlet and passing at least one first fraction of the respectively dispensed flushing fluid to the apparatus for frothing and/or heating milk via the flushing hose, the switching valve switched into the flushing position and the milk suction hose and c) ending the passage of the flushing fluid.

The method according to the invention makes it possible to clean those elements of the beverage preparation machine which come in contact with milk. For this purpose, the switching valve which can be located on the milk container is switched into a flushing position. The flushing fluid is then passed starting from the flushing fluid outlet via the flushing hose, the switching valve and the milk suction hose.

Preferably step b) of the method also includes the step of passing a second fraction of the respectively dispensed flushing fluid from the flushing fluid outlet directly to the apparatus for frothing and/or heating milk. Consequently, this apparatus can be cleaned rapidly and thoroughly by this second fraction of the flushing fluid.

The ratio between the volumes of the first fraction and the second fraction is preferably set. In a preferred embodiment the ratio is set to a value which lies in the range of ⅓ to 3.

After step c) the method preferably additionally includes the steps: d) passing steam from the flushing fluid outlet to the apparatus for frothing and/or heating milk via the flushing hose, the switching valve switched into the flushing position and the milk suction hose, which steam conveys flushing fluid residue from the milk suction hose and/or the apparatus for frothing and/or heating milk and e) ending the passage of steam. Any flushing fluid remaining in the system is therefore conveyed outwards in particular from the apparatus for frothing and/or heating milk and the milk suction hose.

BRIEF DESCRIPTION OF THE FIGURES

Further details of the invention and in particular exemplary embodiments of the beverage preparation machine according to the invention and the method are explained hereinafter with reference to the appended drawings. In the figures.

DETAILED DESCRIPTION OF THE INVENTION

Figure 1A:
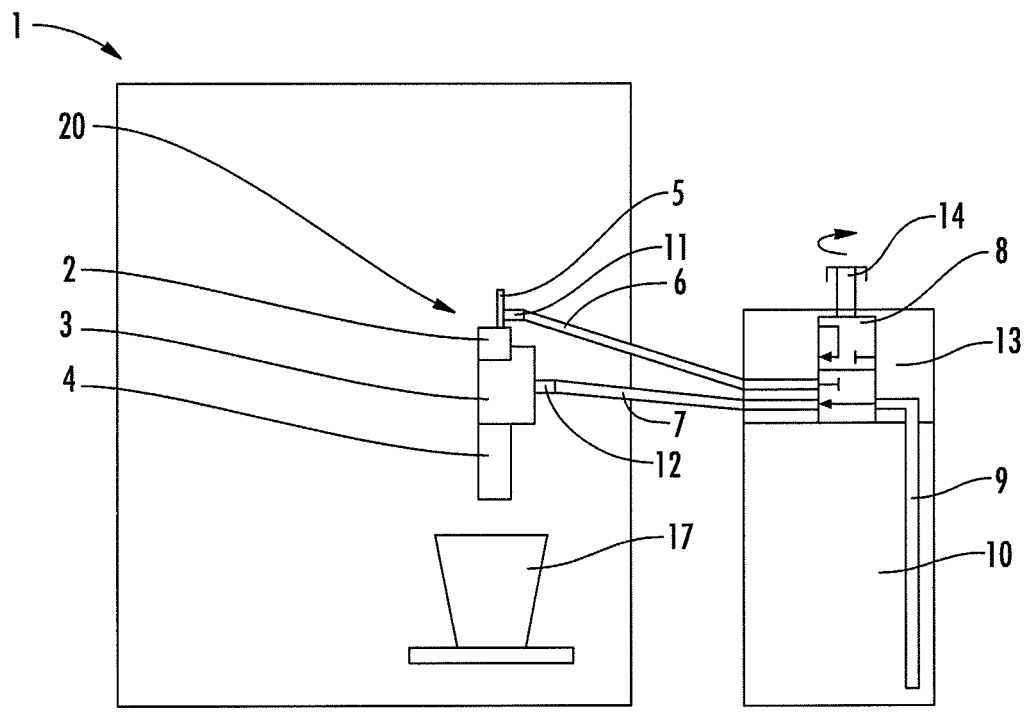
FIG. 1A shows a beverage preparation machine according to the invention having a switching valve wherein a flushing hose is connected to a steam line and the switching valve and the switching valve is brought into an operating position.

FIG. 1A shows a front view of a beverage preparation machine 1 which is designed for preparing a plurality of different beverages, here in particular coffee beverages. This beverage preparation machine 1 contains a milk and/or milk froth dispensing device 20. The beverage preparation machine 1 can furthermore contain a coffee outlet head (not shown) for dispensing specialty coffees. Alternatively, the milk and/or milk froth dispensing device 20 and the coffee outlet head can also be combined into a one-piece unit (not shown) and for this purpose can be designed in particular for the preparation of coffee, heated milk and frothed milk and for the preparation of specialty coffees, which optionally contain milk and/or milk froth.

The milk and/or milk froth dispensing device 20 at the front side of the beverage preparation machine 1 contains an apparatus for frothing and/or heating milk 3. Located downstream of this apparatus 3 is a milk outlet 4 under which a vessel 17 can be placed. Located upstream of the apparatus for frothing and/or heating milk 3 is a steam line 5 which provides the apparatus for frothing and/or heating milk 3 with a hot water/steam mixture. A steam nozzle 2 is interposed between the steam line 5 and the apparatus for frothing and/or heating milk 3. A milk suction hose docking 12 also opens into the apparatus for frothing and/or heating milk 3, to which a milk suction hose 7 (in the present example one end of the milk suction hose 7) is connected, via which milk is supplied from the milk container 10. As a result of the withdrawal of a hot water/steam mixture from the steam outlet 5, the milk from the milk container 10 is sucked into the apparatus for frothing and/or heating milk 3 according to the Venturi principle which will be explained in further detail hereinafter in particular in connection with FIG. 4.

According to the invention, the other end of the milk suction hose 7 opens in an outlet of a switching valve 8 which is attached above the milk container 10. In this case, the switching valve 8 is located inside a milk container lid 13 and can be switched manually into two positions by means of a switching lever 14 projecting above the upper side of the milk container lid 13, for example, by means of a rotary movement (indicated by an arrow). A milk suction lance 9 can be connected at one inlet of the switching valve 8, the other end thereof projects deep into the milk supply of the milk container 10. A flushing hose 6 is connected at another inlet of the switching valve 8, its other end being connected to a flushing hose docking 11. The flushing hose docking 11 is in turn in fluidic communication with the steam outlet 5.

When the switching valve 8 (as shown in FIG. 1A) is switched into an operating position which allows a milk withdrawal and steam or a hot water/steam mixture is withdrawn at the steam outlet 5, the milk is sucked from the milk container 10 via the milk suction lance 9 according to the Venturi principle. The milk is then diverted via the switching valve 8 to the milk suction hose 7. From the milk suction hose 7 the milk then passes via the milk suction hose docking 12 into the apparatus for frothing and/or heating milk 3 and is there heated by the steam or the hot water/steam mixture and possibly (if the milk is mixed with air) frothed. The milk product is then conveyed into the milk outlet 4 and passes from there into the vessel 17. In order that no steam or hot water/steam mixture can enter via the flushing hose docking 11, the flushing hose 6 and therefore into the milk container 10 during this process, the inlet of the flushing hose 6 to the switching valve 8 is closed.

Figure 1B:
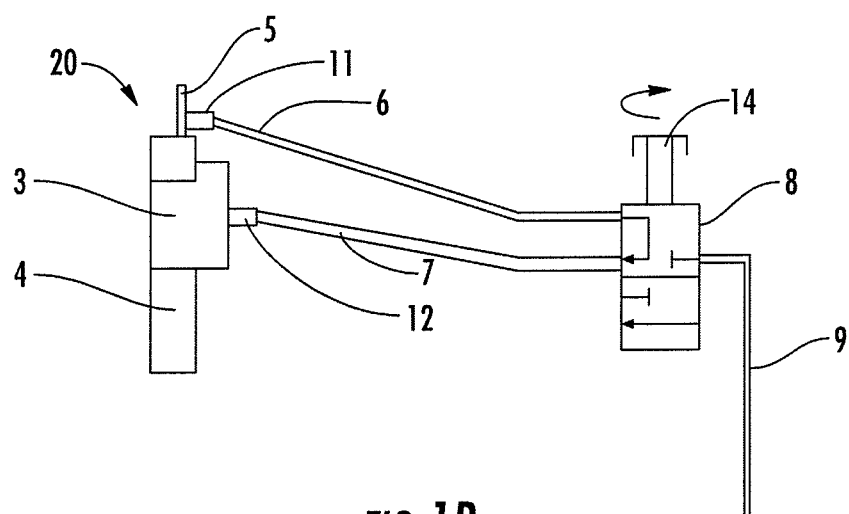
FIG. 1B shows the switching valve according to FIG. 1A, wherein the switching valve is switched into a flushing position.

In order to flush the system, the switching valve 8 is switched by means of manual actuation of the switching lever 14, for example, a rotary movement, into the flushing position (FIG. 1B). This switching can also be accomplished by means of an electrical actuator (not shown) which can be actuated electrically. Then a hot water/steam mixture is passed manually or automatically through the steam outlet 5 to the beverage preparation machine 1, which mixture then flows through the flushing hose 6 to the switching valve 8. This is now switched in such a manner that it passes this mixture further to the milk suction hose 7 or passes it therethrough. The mixture then flushes the milk and milk residues located in the milk suction hose 7 via the milk suction hose docking 12 into the apparatus for frothing and/or heating milk 3. The mixture finally flows through this apparatus 3 to the milk outlet 4 and can then be received in the vessel 17 located thereunder (FIG. 1A). The hot water/steam mixture can not only flush milk and milk residues from the milk suction hose 7 but can also release milk encrustations on the inner wall of the milk suction hose 7 and then flush them away.

Similarly, milk residues and milk encrustations located inside the apparatus for frothing and/or heating milk 3 are flushed out therefrom. It should be mentioned that when the switching valve 8 is located in this flushing position, the access to the milk suction lance 9 is closed so that no hot water/steam mixture enters into the milk container 10 via the milk suction lance 9 (FIG. 1B).

During this flushing operation a certain fraction of the hot water/steam mixture is also passed directly from the steam outlet 5 into the apparatus for frothing and/or heating milk 3 since there is conventionally a connection between the steam outlet 5 and the apparatus for frothing and/or heating milk 3. Consequently, a direct and thorough cleaning of the apparatus for frothing and/or heating milk 3 is carried out. It can, for example, be provided that in each case a fraction of ⅓ of the volume of the hot water/steam mixture dispensed from the steam outlet 5 is passed directly into the apparatus for frothing and/or heating milk 3 and a fraction of ⅔ of the volume of the hot water/steam mixture dispensed from the steam outlet 5 is passed via the flushing hose 6, the switching valve 8 and the milk suction hose 7 into the apparatus for frothing and/or heating milk 3. Consequently, all regions of the beverage preparation machine 1 which come into contact with milk are simply and effectively cleaned. In addition, the user does not need to carry out any inconvenient steps and does not need to touch hoses contaminated with milk.

Directly following the flushing by the hot water/steam mixture, a withdrawal of steam from the steam outlet 5 can be triggered manually or automatically. As a result, the residual water still located in the flushing hose 6, the switching valve 8 and the milk suction hose 7 is conveyed outwards. This has the advantage of preventing an uncontrolled after-running of residual water. In addition, no stagnant residual water is withdrawn during the next withdrawal of milk. Following the flushing process and steam withdrawal, the switching valve 8 can again be switched manually or in an electrically driven manner into the operating position.

Figure 2:
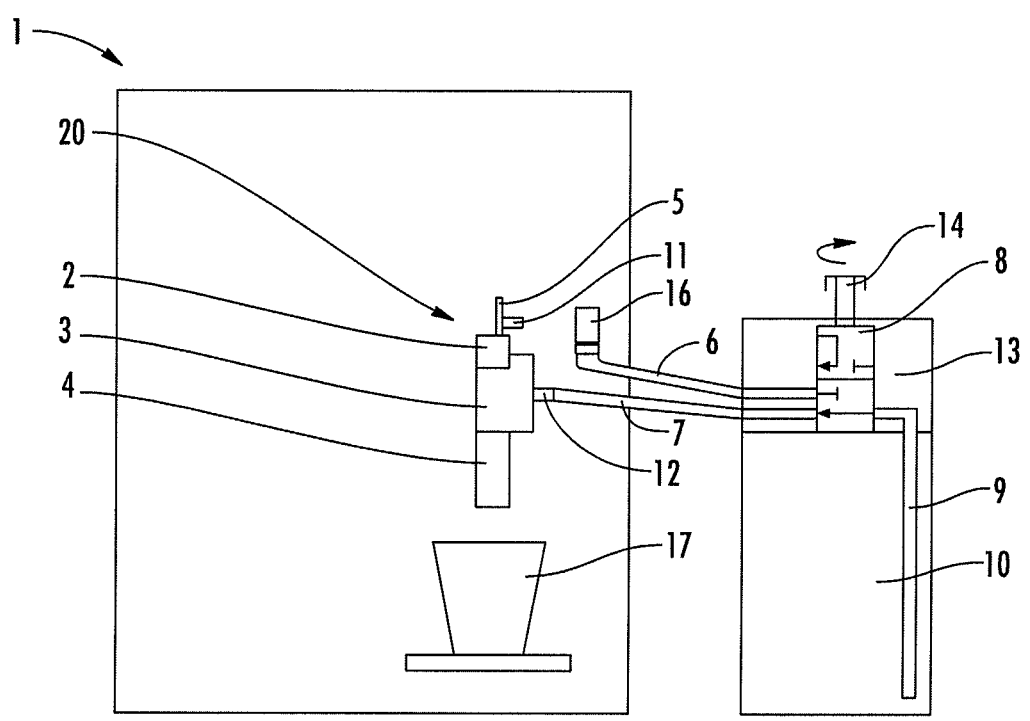
FIG. 2 shows the beverage preparation machine according to FIG. 1A, wherein the flushing hose is connected to a hot water line.

FIG. 2 shows the beverage preparation machine 1 depicted in FIG. 1A in another embodiment. In this case, one end of the flushing hose 6 is connected via the flushing hose docking 11 to a hot water line 16 which is usually present in a coffee machine. The flushing hose 6 can also be connected to any other apparatus for supplying with a suitable medium for cleaning. The functioning principle is similar to that as specified in the description to FIGS. 1A and 1B. In this embodiment it can additionally be provided that a certain fraction of a hot water/steam mixture from the steam outlet 5 is introduced directly into the apparatus for frothing and/or heating milk 3 in order to clean this specifically and thoroughly.

Figure 3:
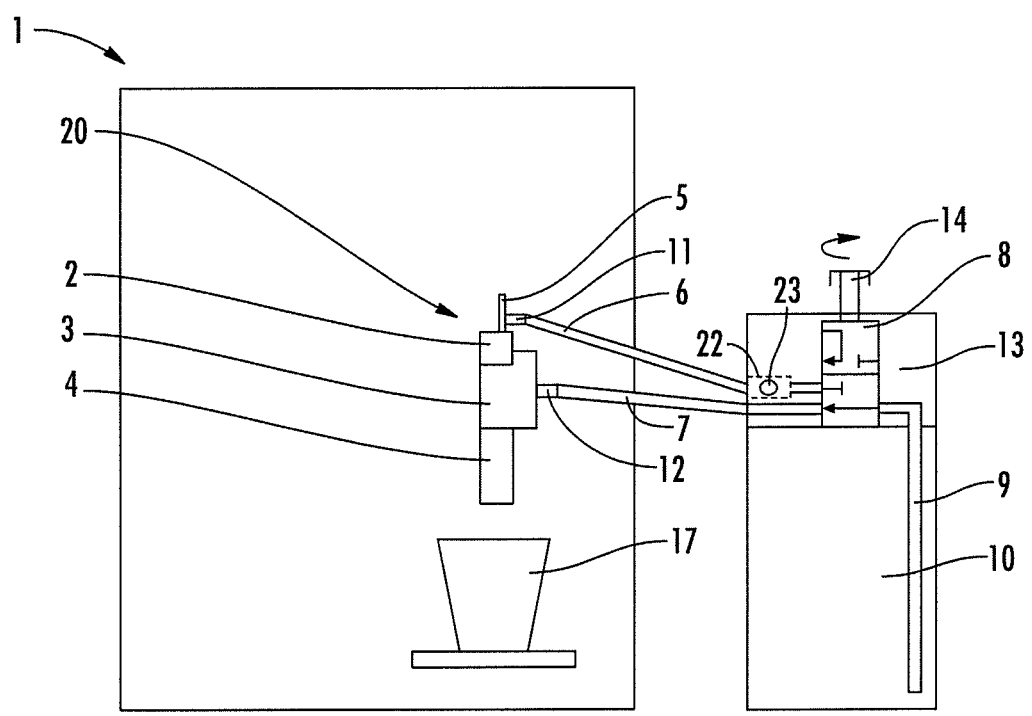
FIG. 3 shows the beverage preparation machine according to FIG. 1A, wherein a cleaning container is located in a milk container.

FIG. 3 shows another embodiment of the beverage preparation machine 1 according to the invention. In this embodiment a cleaning container 22 is disposed in the milk container lid 13 in addition to the switching valve 8. This contains a cleaning agent 23 which can either be a cleaning fluid or a cleaning tablet. In this case, the end of the flushing hose 6 on the side of the milk container 10 is connected to the cleaning container 22. A fluid line is interposed between the cleaning container 22 and the inlet to the switching valve 8. Alternatively the cleaning container 22 and the switching valve 8 can be connected to one another in a fluid-tight manner. In this embodiment the other end of the flushing hose 6 on the side of the beverage preparation machine 1 is connected to the steam outlet 5 via the flushing hose docking 11, as shown in FIG. 1A. Alternatively, this end can be connected via the flushing hose docking 11 to one of the hot water lines, for example, according to the hot water line 16 from FIG. 2. In this embodiment the manner of a milk withdrawal is the same as that as described in FIG. 1A.

In flushing operation, on the other hand, the hot water/steam mixture flows initially via the flushing hose 6 into the cleaning container 22 and then into the inlet of the switching valve 8. In so doing, the hot water/steam mixture receives a certain fraction of the cleaning agent 23. This mixture which is very well suited for cleaning, in particular milk residues, is then passed via the switching valve 8 to the milk suction hose 7 and flushes this. The mixture then flows via the milk suction hose docking 12 into the apparatus for frothing and/or heating milk 3 and ultimately into the milk outlet 4. Consequently, the milk suction hose 7 and the apparatus for frothing and/or heating milk 3 can be cleaned particularly thoroughly and hygienically.

As has already been set out above in connection with the description of FIG. 1B, following the flushing a steam withdrawal via the steam outlet 5 can also be briefly triggered here automatically or manually. This conveys the residual fluid mixed with cleaning agent out from the flushing hose 6, the switching valve 8, the milk suction hose 7 and the apparatus for frothing and/or heating milk 3. On the one hand any after-running of the flushing water mixed with the cleaning agent and also a withdrawal of the same in the next milk withdrawal is therefore prevented. Due to this steam withdrawal, the taste neutrality of the beverage during the next milk withdrawal is advantageously preserved. Following the flushing process the switching valve 8 can again be switched manually or in an electrically driven manner into the milk withdrawal position (according to FIG. 1A).

Figure 4:
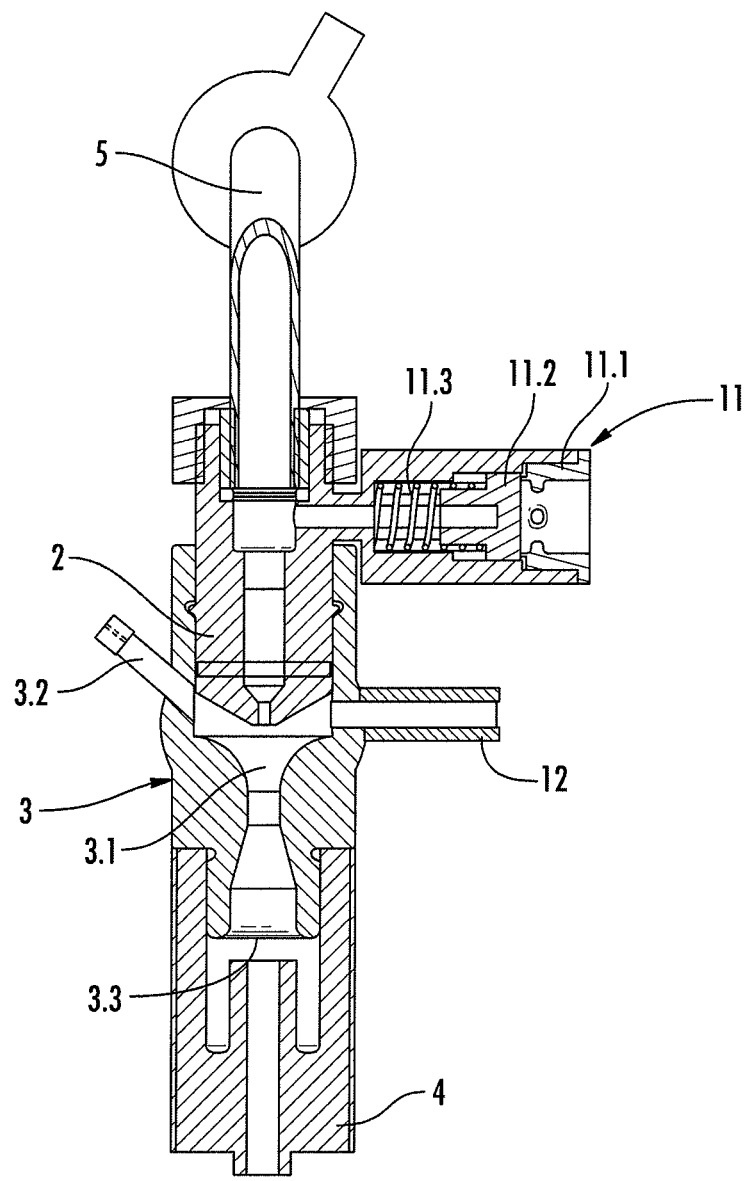
FIG. 4 shows a sectional view of an apparatus for frothing and/or heating milk and elements connected thereto.

FIG. 4 shows the apparatus for frothing and/or heating milk 3 with the downstream-adjoining milk outlet 4, the milk suction hose docking 12, the flushing hose docking 11 and the steam outlet 5 in a sectional view. The apparatus for frothing and/or heating milk 3 is connected to the steam outlet 5 via a pipe which supplies the apparatus 3 with steam or a hot water/steam mixture from the steam outlet 5, wherein the said pipe opens into the steam nozzle 2. As shown in FIG. 4, steam dispensed from the steam outlet 5 or a hot water/steam mixture dispensed from the steam outlet 5 can flow from the steam nozzle 2 into a vacuum chamber 3.1 and thereby generate a vacuum in the vacuum chamber 3.1—as this designation indicates—which makes it possible to suck one or more fluids (milk or air) into the vacuum chamber 3.1 via suitable accesses for the respective fluids (Venturi principle). In order to allow a supply of milk, the milk suction hose docking 12 is connected laterally to the apparatus for frothing and/or heating milk 3 in such a manner that a fluid connection to the vacuum chamber 3.1 is ensured via the milk suction hose docking 12. One end of the milk suction hose docking 12 is configured to receive one end of the milk suction hose 7 (not shown in FIG. 4) in a fluid-tight, rapid and simple manner, for example, by means of a sealed snap closure. As is furthermore shown in FIG. 4, the flushing hose docking 11 can be connected to the steam nozzle 2 in such a manner that the flushing hose docking 11 is in fluid communication with the steam outlet 5 so that steam optionally dispensed from the steam outlet 5 or a hot water/steam mixture dispensed from the steam outlet 5 can be dispensed to a flushing hose 6 connected to the flushing hose docking 11 according to FIG. 1A or 1B. The flushing hose docking 11 comprises a coupling 11.1 for the flushing hose 6 which serves to fix an end of the flushing hose 6 docked onto the flushing hose docking 11 in a predetermined position which ensures a tight connection between the flushing hose docking 11 and the flushing hose 6 against any egress of steam or hot water. As is further indicated in FIG. 4, a valve comprising a valve piston 11.2 and a spring 11.3 is integrated in the flushing hose docking 11. The valve piston 11.2 and the spring 11.3 are arranged [in] a through hole of the flushing hose docking 11 in such a manner that, if no flushing hose 6 is docked into the flushing hose docking 11, the spring 11.3 holds the valve piston 11.2 in a first position in which the valve piston 11.2 prevents any flow of steam and/or hot water through the flushing hose docking 11. If, however, a flushing hose 6 is docked onto the flushing hose docking 11 and connected to the coupling 11.1, the flushing hose 6 is necessarily brought in contact with the valve piston 11.2 in such a manner that the valve piston 11.2 moves against a restoring force of the spring 11.3 and is brought into a second position in which the valve piston 11.2 allows a flow of steam and/or hot water through the flushing hose docking 11 into the flushing hose 6.

During a "milk withdrawal" steam or a hot water/steam mixture flows from the steam outlet 5 into the apparatus for frothing and/or heating milk 3, whereby the milk, as has already been explained, is sucked via the milk suction hose docking 12 into the vacuum chamber 3.1 of the apparatus for frothing and/or heating milk 3 and is heated by mixing with the steam hot water/steam mixture. As is further indicated in FIG. 4, the apparatus for frothing and/or heating milk 3 comprises an opening 3.2 via which the vacuum chamber 3.1 communicates with the surroundings so that air can be supplied into the vacuum chamber 3.1 via the opening 3.2. Consequently, air can be introduced or sucked into the apparatus 3 via the opening 3.2 into the vacuum chamber 3.1 which air froths the milk sucked into the vacuum chamber 3.1 depending on the user specification. This heated milk or frothed heated milk is collected in an emulsion chamber 3.3 communicating with the vacuum chamber 3.1 and is dispensed from there via the milk outlet 4 to a vessel (not shown) placed underneath the milk outlet 4. During the milk withdrawal the switching valve 8 which is not shown in FIG. 4 is set according to FIG. 1A in such a manner that the flushing hose 6 (not shown in FIG. 4) is blocked for steam or a hot water/steam mixture by the switching valve 8. Consequently, no steam or hot water/steam mixture flows from the flushing hose docking 11 into the mixing container 10 (FIG. 1A).

In flushing operation the switching valve 8 is switched, thereby opening the end of the flushing hose 6 on the side of the mixing container 10 and making a fluid connection with the milk suction hose 7 (in accordance with FIG. 1B). In this flushing position the access to the milk suction lance 9 projecting into the milk (see FIG. 1B) is blocked. A hot water/steam mixture dispensed from the steam outlet 5 flushes the milk located in the milk suction hose 7 as well as milk residues and/or milk encrustations located therein out from said hose. This mixture flows via the milk suction hose docking 12 into the apparatus for frothing and/or heating milk 3. From there this mixture is passed via the milk outlet 4 to a vessel placed thereunder and can be collected. In addition to this fluid path described above, there is another fluid path from the steam outlet 5 directly into the apparatus for frothing and/or heating milk 3. Consequently a first fraction of the hot water/steam mixture flows in this order via the flushing hose docking 11, the flushing hose 6, the switching valve 8, the milk suction hose 7 and the milk suction hose docking 12 into the apparatus for frothing and/or heating milk 3. In addition a second fraction of the hot water/steam mixture flows directly via the steam outlet 5 into the apparatus for frothing and/or heating milk 3.

For example, the respective volumes of the first and the second fraction of the hot water/steam mixture can be in a ratio to one another which has a value in the range of ⅓ to 3. This ratio of the respective volumes can be adjusted taking into account the fluidic properties of the components of the apparatus for frothing and/or heating milk 3, wherein for example the dimensions of the individual elements are more suitably selected. Additionally or alternatively a valve (not shown) can be provided in the region of the steam outlet 5 between the flushing hose docking 11 and the milk suction hose docking 12, which valve is configured in such a manner that a predetermined ratio can be set between the respective volume of the first fraction and the volume of the second fraction of the hot water/steam mixture.

Consequently, all the regions of the system which come in contact with milk are rapidly and effectively cleaned. In addition, the handling is very simple and no milk-contaminated hoses need to be touched or reconnected.

In particular the flushing hose 6 and the milk suction hose 7 or the entire fluid system can be completely emptied by a steam withdrawal initiated following the flushing operation. Thus, no stagnant residual water enters into the beverage after a subsequent milk withdrawal. In addition, uncontrolled after-running of residual water is prevented.

The "hoses" described in connection with the invention, in particular the flushing hose 6 and the milk suction hose 7, can each be replaced within the framework of this invention by any line which is suitable for achieving a fluid connection for the fluids mentioned in each case (milk or flushing fluid).

The invention claimed is:
1. A beverage preparation machine comprising:
a steam outlet for dispensing steam or a hot water/steam mixture,
an apparatus for frothing or heating milk, which apparatus is connected via a milk suction hose to a milk container, and
a cleaning apparatus configured to clean the milk suction hose and the apparatus for frothing or heating milk by means of a flushing fluid,
wherein the apparatus for frothing or heating milk comprises a chamber, and a milk suction hose docking, wherein the milk suction hose docking is in fluid communication with the chamber and is configured to receive one end of the milk suction hose,
wherein a steam nozzle for supplying steam or the hot water/steam mixture into the chamber is provided, the steam nozzle being connected to the steam outlet,
wherein the apparatus for frothing or heating milk is configured to cause a vacuum to be generated in the chamber by supplying steam or the hot water/steam mixture from the steam outlet into the chamber via the steam nozzle,
wherein the cleaning apparatus comprises a switching valve and a flushing hose,
wherein the milk suction hose docking is connected to the switching valve via the milk suction hose and the milk suction hose is connected to the milk container via the switching valve,
wherein the switching valve is configured to be switched into an operating position in which a milk connection is enabled between the milk container and the chamber via the switching valve and the milk suction hose, and wherein the switching valve is further configured to be switched to a flushing position in which a first flushing fluid connection is enabled between the steam outlet and the chamber via the flushing hose, the switching valve, and the milk suction hose,
wherein, when the switching valve is switched to the operating position, milk from the milk container is enabled to be sucked into the chamber via said milk connection by a vacuum generated in the chamber by introducing steam or the hot water/steam mixture from the steam outlet via the steam nozzle into the chamber,
wherein when the switching valve is switched to the flushing position, a second flushing fluid connection is enabled between the steam outlet and the chamber via the steam nozzle and a flushing fluid being provided as a hot water/steam mixture is dispensable from the steam outlet to the chamber, and wherein the first flushing fluid connection and the second flushing fluid connection are configured to cause a first fraction of said flushing fluid to be passed through the first flushing fluid connection and a second fraction of the flushing fluid to be passed through the second flushing fluid connection.

2. The beverage preparation machine according to claim 1, wherein the respective volumes of the first fraction and the second fraction are in a predetermined ratio to one another.

3. The beverage preparation machine according to claim 2, in which the predetermined ratio lies in the range of ⅓ to 3.

4. The beverage preparation machine according to claim 1, in which the cleaning apparatus is designed in such a manner that, when the switching valve is switched to the flushing position, following a passage of the flushing fluid, a steam withdrawal from the steam outlet can be achieved in which steam can be passed through the flushing hose, the switching valve and the milk suction hose.

5. The beverage preparation machine according to claim 1, in which a cleaning container containing a cleaning agent is interposed in the first flushing fluid connection between the steam outlet and the switching valve.

6. The beverage preparation machine according to claim 5, in which the cleaning container is disposed on the milk container.

7. The beverage preparation machine according to claim 5, in which the cleaning agent is a cleaning fluid or a cleaning tablet.

8. The beverage preparation machine according to claim 6, in which the cleaning agent is a cleaning fluid or a cleaning tablet.

9. The beverage preparation machine according to claim 1, in which the switching valve can be actuated by means of an electric actuator.

10. A method for cleaning a beverage preparation machine comprising a steam outlet for dispensing steam or a hot water/steam mixture, an apparatus for frothing or heating milk, which apparatus is connected via a milk suction hose to a milk container, and a cleaning apparatus configured to clean the milk suction hose and the apparatus for frothing or heating milk by means of a flushing fluid, wherein the apparatus for frothing or heating milk comprises a chamber and a milk suction hose docking being in fluid communication with the chamber and being configured to receive one end of the milk suction hose, wherein a steam nozzle for supplying steam or a hot water/steam mixture into the chamber is provided, the steam nozzle being connected to the steam outlet, wherein the apparatus for frothing or heating milk is configured to cause a vacuum to be generated in the chamber by supplying steam or a hot water/steam mixture from the steam outlet into the chamber via the steam nozzle, wherein the cleaning apparatus comprises a switching valve and a flushing hose, wherein the milk suction hose docking is connected to the switching valve via the milk suction hose and the milk suction hose is connected to the milk container via the switching valve, wherein the switching valve is configured to be switched into an operating position in which a milk connection is enabled between the milk container and the chamber via the switching valve and the milk suction hose, and wherein the switching valve is further configured to be switched to a flushing position in which a first flushing fluid connection is enabled between the steam outlet and the chamber via the flushing hose, the switching valve and the milk suction hose, wherein when the switching valve is switched to the operating position, milk from the milk container is enabled to be sucked into the chamber via said milk connection by a vacuum generated in the chamber by introducing steam or a hot water/steam mixture from the steam outlet via the steam nozzle into the chamber, and wherein, when the switching valve is switched to the flushing position, a second flushing fluid connection is enabled between the steam outlet and the chamber via the steam nozzle and a flushing fluid being provided as a hot water/steam mixture that is dispensable from the steam outlet to the chamber, and wherein the first flushing fluid connection and the second flushing fluid connection are configured to cause a first fraction of said flushing fluid to be passed through the first flushing fluid connection and a second fraction of the flushing fluid to be passed through the second flushing fluid connection, wherein the method comprises:

a) switching the switching valve to the flushing position in which the first flushing fluid connection is enabled between the steam outlet and the chamber of the apparatus for frothing or heating milk via the flushing hose, the switching valve and the milk suction hose, b) dispensing the flushing fluid being provided as a hot water/steam mixture from the steam outlet and passing a first fraction of the respectively dispensed flushing fluid to the chamber via the flushing hose, the switching valve and the milk suction hose and passing a second fraction of the respectively dispensed flushing fluid to the chamber via the steam nozzle, and c) ending the dispensing of the flushing fluid.

11. The method according to claim 9, in which the ratio between the respective volume of the first fraction and the respective volume of the second fraction is set.

12. The method according to claim 11, in which the ratio is set to a value which lies in the range of ⅓ to 3.

13. The method according to claim 10 which after step c) comprises:

d) passing steam from the steam outlet to the apparatus for frothing or heating milk via the flushing hose, the switching valve switched into the flushing position and the milk suction hose, which steam conveys flushing fluid residue from the milk suction hose or the apparatus for frothing or heating milk, and e) ending the passage of steam.

* * * * *

UNITED STATES PATENT AND TRADEMARK OFFICE
CERTIFICATE OF CORRECTION

Page 1 of 1

PATENT NO. : 8,770,099 B2
APPLICATION NO. : 12/832645
DATED : July 8, 2014
INVENTOR(S) : Reyhanloo It is certified that error appears in the above-identified patent and that said Letters Patent is hereby corrected as shown below:

In the Claims,

Col. 14, line 41, "9" is deleted and replaced with "10" in order to correct the dependency of claim 11.

Signed and Sealed this
Thirtieth Day of June, 2015

Michelle K. Lee
*Director of the United States Patent and Trademark Office*